US010430015B2

(12) United States Patent
Patil et al.

(10) Patent No.: US 10,430,015 B2
(45) Date of Patent: Oct. 1, 2019

(54) IMAGE ANALYSIS

(71) Applicant: International Business Machines Corporation, Armonk, NY (US)

(72) Inventors: Sandeep R. Patil, Pune (IN); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 714 days.

(21) Appl. No.: 13/963,251

(22) Filed: Aug. 9, 2013

(65) Prior Publication Data

US 2015/0046474 A1    Feb. 12, 2015

(51) Int. Cl.
| | |
|---|---|
| *G06F 3/0484* | (2013.01) |
| *G06T 1/00* | (2006.01) |
| *G06T 7/00* | (2017.01) |
| *G06F 16/58* | (2019.01) |
| *G06F 3/048* | (2013.01) |

(52) U.S. Cl.
CPC .......... *G06F 3/048* (2013.01); *G06F 3/04842* (2013.01); *G06F 16/58* (2019.01); *G06T 1/00* (2013.01); *G06T 7/00* (2013.01)

(58) Field of Classification Search
CPC ......... G06F 17/30864; G06F 17/30277; G06F 17/30244; G06F 17/30247; G06F 17/30265; G06F 17/30634; G06F 17/3005; G06F 3/04845; G06F 3/1415; G06T 7/00
USPC ........ 707/705–706, 721–722, 748, 751, 755, 707/765
See application file for complete search history.

(56) References Cited

U.S. PATENT DOCUMENTS

| | | | |
|---|---|---|---|
| 7,548,936 B2 | 6/2009 | Liu et al. | |
| 8,209,330 B1 | 6/2012 | Covell et al. | |
| 8,285,052 B1* | 10/2012 | Bhattacharyya | G06F 17/30247 382/190 |
| 9,025,810 B1* | 5/2015 | Reinhardt | G09G 5/38 345/419 |
| 2006/0155684 A1* | 7/2006 | Liu et al. | 707/3 |
| 2007/0097420 A1* | 5/2007 | Shah | G06F 17/30247 358/1.15 |

(Continued)

FOREIGN PATENT DOCUMENTS

WO    WO 2012/058794 A1    5/2012

OTHER PUBLICATIONS

Datta et al. "Image Retrieval: Ideas, Influences, and Trends of the New Age" ACM Computing Surveys, vol. 40, No. 2 Article 5 (Apr. 2008); 60 pages.*

(Continued)

*Primary Examiner* — David T. Brooks
*Assistant Examiner* — Berhanu Mitiku
(74) *Attorney, Agent, or Firm* — Stephen J. Walder, Jr.; Robert Sullivan (57) ABSTRACT

Mechanisms for displaying an ordered sequence of images are provided. The mechanisms receive a search query as input from a user. The search query includes a start point and an end point of a virtual tour. The start point and the end point determine a boundary of the virtual tour. Based on the search query, images that are within the boundary of the virtual tour defined in the search query are collected. At least a subset of the collected images are displayed in an ordered sequence in accordance with the boundary of the virtual tour.

20 Claims, 3 Drawing Sheets

(56) References Cited

U.S. PATENT DOCUMENTS

| | | | | |
|---|---|---|---|---|
| 2008/0086686 | A1* | 4/2008 | Jing | G01C 21/3605 |
| | | | | 715/706 |
| 2010/0070523 | A1* | 3/2010 | Delgo | G06F 17/3079 |
| | | | | 707/769 |
| 2010/0251101 | A1* | 9/2010 | Haussecker | G06T 17/05 |
| | | | | 715/243 |
| 2011/0044549 | A1* | 2/2011 | Bressan | G11B 27/034 |
| | | | | 382/225 |
| 2011/0194761 | A1 | 8/2011 | Wang et al. | |
| 2011/0196897 | A1* | 8/2011 | Koch et al. | 707/792 |
| 2011/0292231 | A1* | 12/2011 | Winters | 348/222.1 |
| 2012/0110453 | A1 | 5/2012 | Ma et al. | |

OTHER PUBLICATIONS

Kak et al. Computer Vision Techniques for Content-Based Image Retrieval from Large Medical Databases. School of Electrical and Computer Engineering Purdue University, Jan. 27, 2006.*

Rui et al. "Image Retrieval: Current Techniques, Promising Directions and Open Issues" CSE Fellowship, College of Engineering & Beckman Institute, University of Illinois at Urbana-Champaign, May 14, 2004.*

Krist, Joel et al., "Office Business Application for Customer Support Management", Microsoft Corporation, http://msdn.microsoft.com/en-us/library/cc185134(v=office.12).aspx, Feb. 2008, 29 pages.

Liu, Hao et al., "Effective Browsing of Web Image Search Results", MIR'04 Proceedings of the 6th ACM SIGMM international workshop on Multimedia information retrieval, Oct. 15-16, 2004, 7 pages.

Wang, Shuo et al., "IGroup: Presenting Web Image Search Results in Semantic Clusters", ACM, CHI 2007 Proceedings of the SIGCHI Conference on Human Factors in Computing Systems, Apr. 28-May 3, 2007, pp. 1-10.

* cited by examiner

IMAGE ANALYSIS

BACKGROUND

Embodiments of the present invention generally relate to mechanisms for performing an image analysis and search, and more particularly, to a method and system for creating and displaying an image tour in response to a search query having a relationship to an image.

Use of the Internet, especially for searching information, has exponentially risen, becoming a common means of access to information. In addition to traditional text-based searches that can be performed on the Internet (or the web; the "Internet" and the "web" will be used interchangeably and have the same meaning), searching for image and video searches is gaining popularity.

Comprehending and assimilating information via visual means, such as static images or videos, should typically be easier and faster than text based information. For example, there are a number of tools, or search engines, that provide content based image retrieval, also known as query based image content; an application of computer vision techniques to image retrieval problems, especially when it comes to searching images in a large database. Image searching may be a more complicated task than just a simple text based search due to a number of different factors involved.

If an input is provided in terms of a text search query, with the input being provided to an image search engine, metadata information of the images that is stored in an image database, or webpages containing images, are mapped to the search query. Images in the database, or webpages, whose metadata information matches the search query provided may be displayed in the search results. However, certain search queries may not yield actionable results, especially when the query is defined between two or more boundary values, in terms of static images. In such a case, users generally are referred to videos from search engines like "You Tube" or the likes, whereas the requirement was to obtain static images in an ordered manner.

An object of the embodiments of this invention is to overcome some the disadvantages and provide a user with static images between defined boundaries identified by the user in an ordered or sequential manner.

SUMMARY

A method, system and computer program product for receiving, as input from a user, a search query, wherein the search query includes a start point and an end point of a visual tour. The start point and the end point determine a boundary of the virtual tour. Based on the search query, images that are within the boundary defined by the user search query are collected. The images are displayed to the user in an ordered sequence. A further embodiment includes arranging the images collected within the boundary defined in a ordered sequence with the step of collecting all images including referencing publically available content. Another embodiment includes the images being tagged with metadata, wherein the metadata is associated with the image automatically, or manually by a user. In yet a further embodiment, the images are arranged in sequential order or an ordered manner based on the metadata.

In a further embodiment, the metadata associated with the images is geographical information, coordinates, location based data, a latitude, a longitude, a combination of a latitude and a longitude, or other data associated with a location. The metadata may include either an image description or an image ranking. In a further embodiment, the user selects or rearranges the ordered sequence based on end user inputs or audience ranking of the images within the boundary.

In an embodiment, as input from a user, a search query is received, wherein the search query includes a start point and an end point in relation to an image, for example of a visual tour. The start point and the end point may determine a boundary of the virtual tour. Based on the search query, images that are within the boundary defined by the user search query are collected and are arranged in a ordered sequence. The images are displayed to the user in an ordered sequence.

In one embodiment, the boundary can also be a closed or open contour, where a user will provide at least three (3) or more end points to define any contour. A contour may be identified using various mathematical techniques, for example curve fitting or least square method, or the like. Further, the user may also define the boundary of end points by providing the condition of a Locus, with the illustrative embodiment identifying the subsequent points and deriving the path.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not specifically addressed herein. It should be understood that these concepts and applications fall within the scope of the disclosure and the accompanying claims.

As will be appreciated by one skilled in the art, embodiments of the present invention may be embodied as a system, method, or computer program product. Accordingly, embodiments of the present invention may take the form of an entirely hardware embodiment, an entirely software embodiment (including firmware, resident software, microcode, etc.) or an embodiment combining software and hardware embodiments that may all generally be referred to herein as a "circuit," "module" or "system". Furthermore, embodiments of the present invention may take the form of a computer program product, embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium, that is not a computer readable storage medium, and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As an illustrative example of one of the embodiments of the invention, consider a particular scenario where a user wants to view Analysis Service Cube Development methods in sequential images. Looking at the image search results, the user can understand how Analysis Service Cubes are to be developed. Looking at static images takes far less time compared to watching videos associated with understanding of the development of analysis service cubes. In another example, consider a user who wants to find images for a trip, "New York to Washington D.C. via or by train". In this case, the user wants the image search results to display images in a sequential or ordered manner for the particular travel path between New York and Washington D.C. via train conveyance. Currently there is no provision in search engines to analyze the search query and provide users with static images defined between the two boundaries of New York and Washington D.C. in a sequential manner. Embodiments of the present invention address these particular issues.

Figure 1:
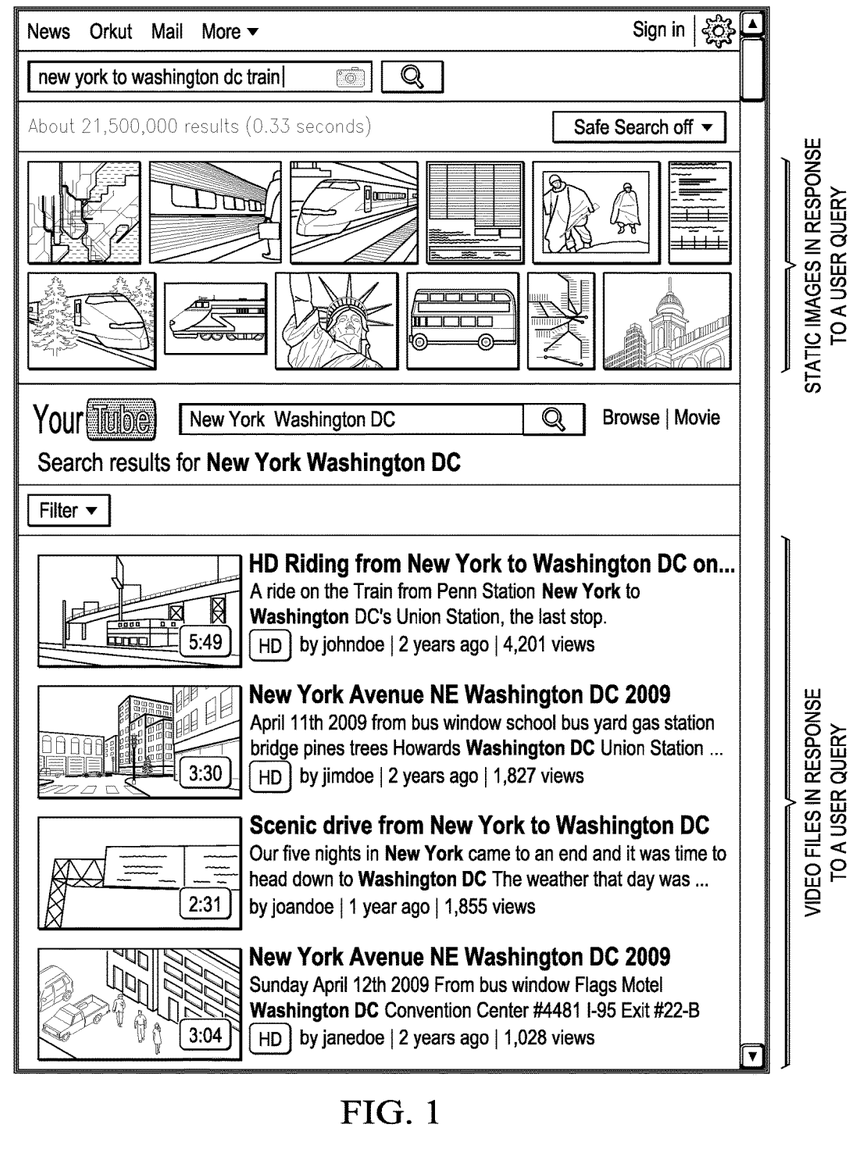
FIG. 1 is an exemplary embodiment of an image based search displaying images and videos.

FIG. 1 depicts an exemplary embodiment of the present invention in which an image based search is performed by user on the Internet. For example, assume that the user wants to find images for a search query "New York to Washington D.C. by train". The objective of the user is to see or gather all images which can describe the journey from the first destination, New York, to the second destination, Washington D.C., in terms of static or dynamic images. FIG. 1 illustrates some of the images and video files that can be obtained as a result of the query entered by the user. This basically shows a number of different images or video files that have been uploaded to publically available sites. The images or video files obtained as a result of the search are not ordered, but may be ranked, for example, by the most viewed and so on. These images and/or video files are different in nature as they are captured by different people during their journey at different places at different time frames, and are typically arranged in a random manner in the results generated by a search.

Figure 2:
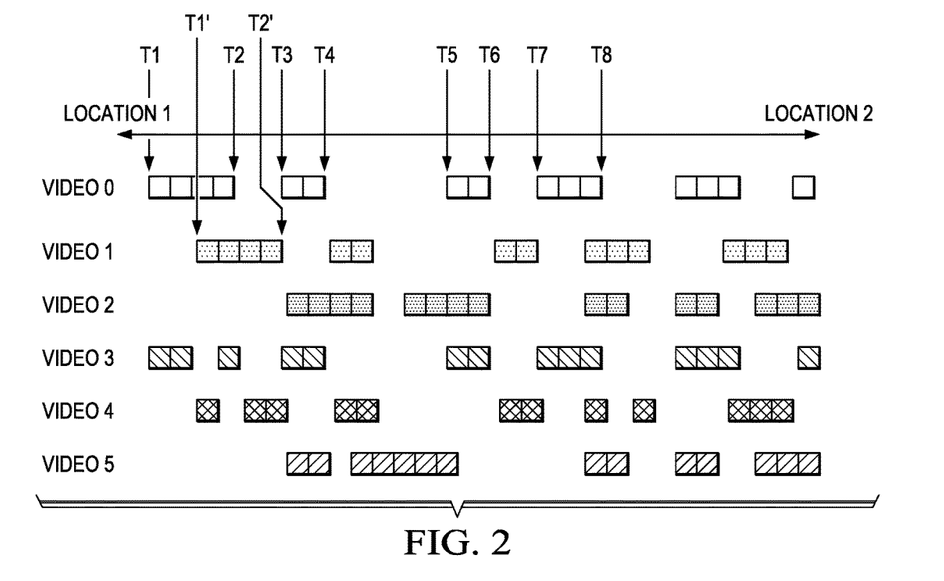
FIG. 2 is an exemplary embodiment of the various image and video frames in accordance with the present invention.

Reference is now made to FIG. 2, which depicts an exemplary embodiment of the present invention in which the various image and video frames in are arranged in a sequential manner. Different images and videos, specifically the content for a search query, are available in different servers. These images and videos may cover different distances between the source and the destination, e.g., the start and end points, or in general the two locations of a sequence of images. Different users have captured different images and videos while travelling from the first location to the other location, i.e., the destination. In some cases, users have captured images and/or videos for a give period of time, then stopped and then again captured images and/or videos. Thus, the user's images/videos may not be a continuous video stream from destination 1 to destination 2, but instead there exists a number of breaks in the videos between destination 1 and destination 2. Further there could be images that are intermittent between the videos or overlapping the videoed regions. In FIG. 2, the video frames are shown as blocks and the period when there are no recordings or images available are shown as blank.

As mentioned above, these video frames and/or images may have associated metadata that identifies the time the video frames and/or images were captured, the positional or geographic location where the images were captured, and the like. This information may be used to draw comparisons between the frames/images or sequences of frames/images, so as to determine an order of the frames/images relative to one another. For example, if a path between two locations is to be traced by a sequence of images, then a frame/image closer to a start location should appear earlier in the sequence of images than a frame/image that is further away from the start location. Similarly, time parameters may be able to be used to identify frames/images that were taken at different times relative to one another to further identify a time sequence of frames/images.

For example, video 0, has a recording between T1 and T2, then between time period T2 and T3 there is no recording; between T3 and T4 a recording exists, between T4 and T5 there is no recording an so on, clearly indicating that the video and/or images are taken at different time frames. Now consider Video 1, which has a recording between the time period T1' and T2' and then follows the similar traits of video 0 of recording and non-recording at different intervals of time. The same holds true for other video streams, video 2, video 3, video 4 and video 5, as an exemplary embodiment. What is interesting to note here is that there is an overlap of the videos/images within a given time period of the various different video streams/images. For example as indicated in FIG. 2, video 0 is recorded between T1 and T2 and there is no recording between T2 and T3. However, in the interval T2 to T3, when there has been no recording of video 0, video 1 has a recording made between the region T1' and T2', which has an overlap of the missing regions T2 to T3 of video 0. Similarly, video 3, video 4 and video 5 have overlap regions between T2 and T3 of video 0, in addition to the overlap regions posted by video 1.

In accordance with the illustrative embodiments, based on a users configuration of the mechanisms of the illustrative embodiments, appropriate video frames and/or images from those depicted may be combined to form a series of video frames/images of a single video. These video frames and/or images can be identified from the frames in FIG. 2 and, accordingly, the image search results will be displayed to the user in an ordered sequence. Appropriate frames will be identified from multiple single video frames and/or images from the videos and will be displayed to the user in an ordered sequence. This will make it appear to the user as if the images are so arranged to show precisely the search query, i.e., a journey in the direction from New York to Washington D.C. by train, even though the frames/images themselves may be taken from various video frame sequences taken by the same or different users. In one embodiment the user may change the density of the image search results per unit length of video. Therefore, most or all of the images/videos are captured that gives a complete picture to the user of a train journey between the first destination, New York, and the second destination, Washington D.C. As a result, a complete tour, i.e., a virtual tour is presented to the user.

Figure 3:
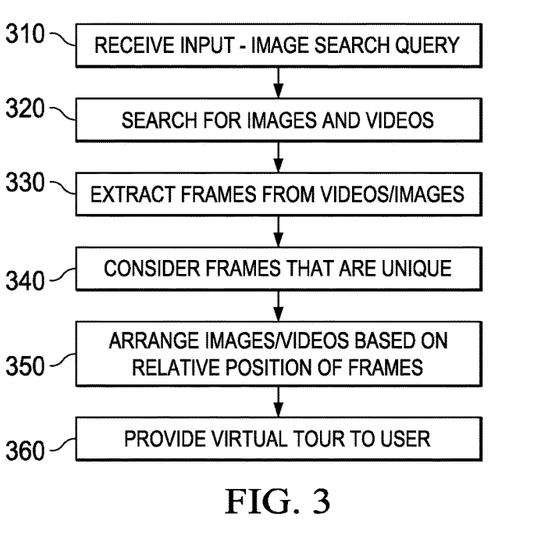
FIG. 3 is an exemplary embodiment of a method in accordance with the present invention.

Reference is now made to FIG. 3 which provides an exemplary embodiment of a method that may be used to perform the operations of the present invention. As shown in FIG. 3, in Step 310, an image search query is received, which may be generated by a user. The search query typically consists of two boundaries, which specifies the starting point and the end point for the search. Also, the user would require the images and videos to be arranged in such a way, typically in an ordered manner, such that the end result for the user is achieved. A user can define the density of the images to the displayed in one embodiment, wherein a slider or a means to control the density of the images is provided to the user. For example, the highest density would be displaying every frame, wherein the user preference may vary because one user may want 1 frame per minute and another user may want 1 frame in 30 seconds. In another embodiment, the user can also provide his profiles such as likes and dislikes to filter the images and videos.

In Step 320, the image search query is processed by a search engine, preferably a image search engine which can search for all videos and images (static and dynamic) within the defined boundaries. In Step 330, the frames are extracted from each of the videos and images that can be identified from the search results as indicated in the exemplary embodiment of FIG. 2, for example. In Step 340, from the extracted video frames and the images, all video frames and images that are unique will be considered and selected/marked. Once this is completed, in Step 350, in accordance with an embodiment of the invention, all video frames and/or images will be arranged based on a relative position of each frame to one another. for example in FIG. 2, video 0 has not captured some details of locations (between time period T2 and T3) but video 1 and video 4 have captured those details between the time periods T2 and T3. In this manner relative position of the frames can be identified and the videos and images arranged in an ordered manner. It should also be noted here that at each instant of time, the position of each frame will be validated against adjacent positions of other frames in the same of different video. In one embodiment of Step 350 the search engine will identify images that are of high quality and based on the user's requirements, such as frame density or profile, appropriate images will be identified and displayed in the search results in a sequence such that in Step 360, the user can view through the virtual tour.

The "location" of one frame/image relative to another may be measured with regard to time location, physical or geographical location, or both. Thus, a sequence of frames/images generated based on location may identify an order of frames/images based on their temporal and spatial location relative to one another. Moreover, frames/images that overlap in time and spatial location may be differentiated from one another by the time location such that more recently acquired frames/images may be selected over older frames/images. Whether to use temporal location, spatial location, a combination of both, whether to differentiate between frames/images to select more recent frames/images, and the like, may all be specified by the user as part of a user profile or the like. Of course default parameters may also be utilized when a user profile is not available.

Figure 4:
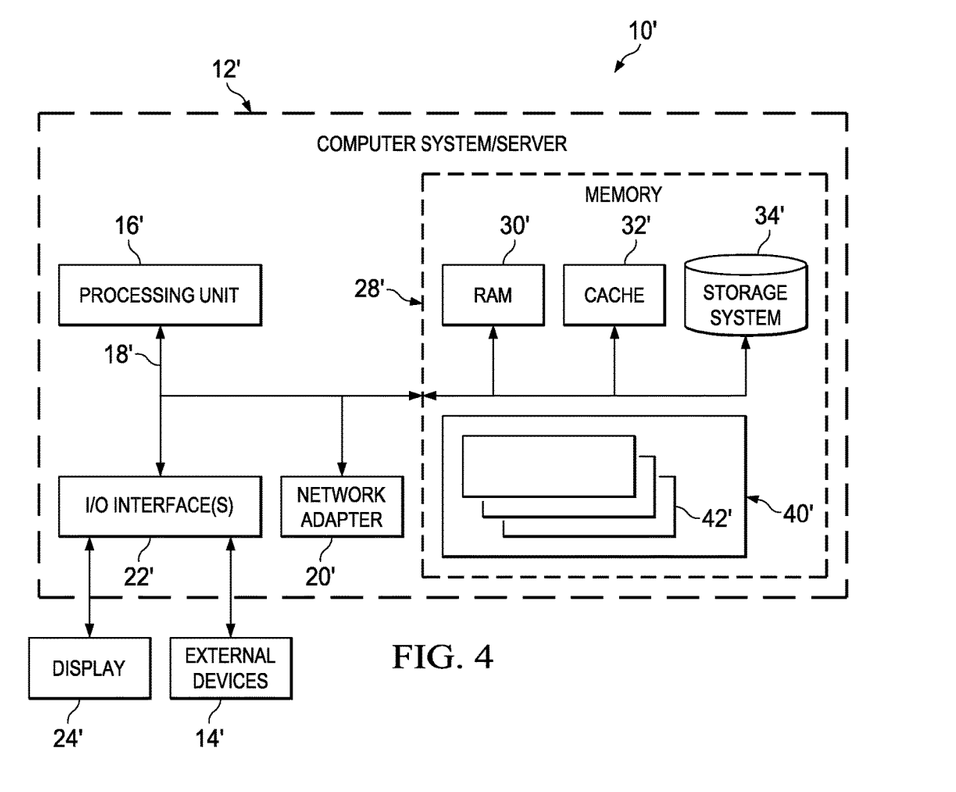
FIG. 4 is an exemplary embodiment of a computer system on which the present invention can operate.

The method depicted in FIG. 3 is operational on a computer system, such as the computer system of FIG. 4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIG. 3 can be performed or utilized by way of a processing unit or units and system memory such as those indicated, respectively, at 16' and 28' in FIG. 4, whether on a server computer, a client computer, a node computer in a distributed network, or any combination thereof.

The computing device shown in FIG. 4 may be implemented as a cloud computing node in some illustrative embodiments. In FIG. 4, the cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other type network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, in a data processing system comprising a processor and a memory, for displaying an ordered sequence of images, comprising:
   receiving, in the data processing system, a search query as input from a user, wherein the search query includes a start point and an end point of a virtual tour, and wherein the start point and the end point are different points spatially located remotely from one another and determine a boundary of the virtual tour;
   collecting, by the data processing system, based on the search query, images that are within the boundary of the virtual tour defined in the search query, wherein the images are from different sets of images or videos obtained from different users and are collected in a non-ordered collection of images;
   selecting, by the data processing system, from the non-ordered collection of images, a subset of images based on user specified image density criteria and user-specified filter criteria, and wherein the subset of images comprises at least two images that are from different users and from different sets of images or videos;
   ordering, by the data processing system, images in the subset of images according to a relative position of the images relative to the start point and end point of the virtual tour, and relative to one another with regard to at least one of a temporal metric or a spatial metric, to thereby generate an ordered sequence of images; and
   displaying, by the data processing system, to the user, the subset of images in the ordered sequence of images in accordance with the boundary of the virtual tour, wherein the user specified image density criteria specifies a number of images per time unit of the virtual tour.

2. The method of claim 1, wherein the images are tagged with metadata, and wherein the images in the collected images are ordered based on the metadata associated with the images.

3. The method of claim 2, wherein the metadata associated with the images comprises at least one of geographical information or coordinates, location based data, a latitude or a longitude, or a combination of a latitude and a longitude.

4. The method of claim 2, wherein the subset of images is selected from the collected images based on both temporal location metadata associated with the images and spatial location metadata associated with the images.

5. The method of claim 4, wherein overlapping images in the collected images that have an overlapping spatial location information pertaining to a geographical location to which content of the collected images correspond, are differentiated from one another based on temporal location metadata associated with the overlapping images, and wherein an overlapping image having a temporal location that is more recent relative to a current time than other overlapping images is selected for inclusion in the subset of images.

6. The method of claim 1, wherein the filter criteria comprises like/dislike criteria of a user profile associated with the user from which the search query is received.

7. The method of claim 1, wherein the start point is a first spatial location and the end point is a second spatial location different from the first spatial location, wherein the selecting the subset of images comprises, for each set of the different sets of images or videos:
   selecting images from the non-ordered collection of images that are unique and meet the user specified image density criteria and user specified filter criteria;
   arranging the selected images according to relative position to the first spatial location and the second spatial location and relative times that the selected images were captured, to thereby generate a sequential series of images for the set of images or videos, and wherein the subset of images is further selected at least by selecting images from the different sequential series of images of the different sets of images or videos, based on relative location of the images between the different sequential series of images.

8. The method of claim 1, wherein the virtual tour is a trip from a first geographical location corresponding to the start point along a physical route to a second geographical location corresponding to the end point, wherein a number of images in the subset of images is selected at least based on the user specified image density criteria, and wherein particular images from the non-ordered collection of images are selected for inclusion in the subset of images based on the user specified filter criteria.

9. A system, comprising:
   a processor; and
   a memory coupled to the processor, wherein the memory comprises instructions which, when executed by the processor, cause the processor to:
   receive a search query as input from a user, wherein the search query includes a start point and an end point of a virtual tour, and wherein the start point and the end point are different points spatially located remotely from one another and determine a boundary of the virtual tour;
   collect, based on the search query, images that are within the boundary of the virtual tour defined in the search query, wherein the images are from different sets of images or videos obtained from different users and are collected in a non-ordered collection of images;
   select, from the non-ordered collection of images, a subset of images based on user specified image density criteria and user-specified filter criteria, and wherein the subset of images comprises at least two images that are from different users and from different sets of images or videos;

order images in the subset of images according to a relative position of the images relative to the start point and end point of the virtual tour, and relative to one another with regard to at least one of a temporal metric or a spatial metric, to thereby generate an ordered sequence of images; and display, to the user, the subset of images in the ordered sequence of images in accordance with the boundary of the virtual tour, wherein the user specified image density criteria specifies a number of images per time unit of the virtual tour.

10. The system of claim 9, wherein the images are tagged with metadata, and wherein the images in the collected images are ordered based on the metadata associated with the images.

11. The system of claim 10, wherein the subset of images is selected from the collected images based on both temporal location metadata associated with the images and spatial location metadata associated with the images.

12. The system of claim 11, wherein overlapping images in the collected images that have an overlapping spatial location information pertaining to a geographical location to which content of the collected images correspond, are differentiated from one another based on temporal location metadata associated with the overlapping images, and wherein an overlapping image having a temporal location that is more recent relative to a current time than other overlapping images is selected for inclusion in the subset of images.

13. The system of claim 9, wherein the filter criteria comprises like/dislike criteria of a user profile associated with the user from which the search query is received.

14. The system of claim 9, wherein the start point is a first spatial location and the end point is a second spatial location different from the first spatial location, wherein the selecting the subset of images comprises, for each set of the different sets of images or videos:

selecting images from the non-ordered collection of images that are unique and meet the user specified image density and filter criteria;

arranging the selected images according to relative position to the first spatial location and the second spatial location and relative times that the selected images were captured, to thereby generate a sequential series of images for the set of images or videos, and wherein the subset of images is further selected at least by selecting images from the different sequential series of images of the different sets of images or videos, based on relative location of the images between the different sequential series of images.

15. A computer program product, comprising:

a computer readable storage medium having computer readable program code embodied therewith, where the computer readable program code when executed on a computer causes the computer to:

receive a search query as input from a user, wherein the search query includes a start point and an end point of a virtual tour, and wherein the start point and the end point are different points spatially located remotely from one another and determine a boundary of the virtual tour;

collect, based on the search query, images that are within the boundary of the virtual tour defined in the search query, wherein the images are from different sets of images or videos obtained from different users and are collected in a non-ordered collection of images;

select, from the non-ordered collection of images, a subset of images based on user specified image density criteria and user-specified filter criteria, and wherein the subset of images comprises at least two images that are from different users and from different sets of images or videos;

order images in the subset of images according to a relative position of the images relative to the start point and end point of the virtual tour, and relative to one another with regard to at least one of a temporal metric or a spatial metric, to thereby generate an ordered sequence of images; and display, to the user, the subset of images in the ordered sequence of images in accordance with the boundary of the virtual tour, wherein the user specified image density criteria specifies a number of images per time unit of the virtual tour.

16. The computer program product of claim 15, wherein the images are tagged with metadata, and wherein the images in the collected images are ordered based on the metadata associated with the images.

17. The computer program product of claim 16, wherein the subset of images is selected from the collected images based on both temporal location metadata associated with the images and spatial location metadata associated with the images.

18. The computer program product of claim 17, wherein overlapping images in the collected images that have an overlapping spatial location information pertaining to a geographical location to which content of the collected images correspond, are differentiated from one another based on temporal location metadata associated with the overlapping images, and wherein an overlapping image having a temporal location that is more recent relative to a current time than other overlapping images is selected for inclusion in the subset of images.

19. The computer program product of claim 15, wherein the filter criteria comprises like/dislike criteria of a user profile associated with the user from which the search query is received.

20. The computer program product of claim 15, wherein the start point is a first spatial location and the end point is a second spatial location different from the first spatial location, wherein the selecting the subset of images comprises, for each set of the different sets of images or videos:

selecting images from the non-ordered collection of images that are unique and meet the user specified image density and filter criteria;

arranging the selected images according to relative position to the first spatial location and the second spatial location and relative times that the selected images were captured, to thereby generate a sequential series of images for the set of images or videos, and wherein the subset of images is further selected at least by selecting images from the different sequential series of images of the different sets of images or videos, based on relative location of the images between the different sequential series of images.

\* \* \* \* \*